United States Patent
Smink et al.

(10) Patent No.: US 7,442,742 B1
(45) Date of Patent: Oct. 28, 2008

(54) MASTERBATCH COMPOSITION

(75) Inventors: Jeffrey S. Smink, Rockwell, NC (US);
Ronald M. Harris, Cumming, GA (US);
Robert R. Powers, Bucyrus, OH (US);
Andrew J. Schwartz, Powell, OH (US);
Rick D. Martz, Dublin, OH (US)

(73) Assignee: Carolina Color Corporation, Salisbury, NC (US)

( * ) Notice: Subject to any disclaimer, the term of this patent is extended or adjusted under 35 U.S.C. 154(b) by 0 days.

(21) Appl. No.: 11/732,606

(22) Filed: Apr. 4, 2007

(51) Int. Cl.
*C08L 23/00* (2006.01)

(52) U.S. Cl. .................. 524/528; 523/351; 524/583; 524/584; 525/190

(58) Field of Classification Search ............. 525/190; 524/583, 584, 528; 523/351
See application file for complete search history.

(56) References Cited

U.S. PATENT DOCUMENTS

| | | | |
|---|---|---|---|
| 4,510,271 A | 4/1985 | Muhle et al. | |
| 4,810,733 A * | 3/1989 | Sakuma et al. | 523/206 |
| 5,604,279 A | 2/1997 | Bernhardt et al. | |
| 5,718,753 A | 2/1998 | Suzuki et al. | |
| 6,143,846 A * | 11/2000 | Herrmann et al. | 526/170 |
| 6,150,442 A * | 11/2000 | Chundury et al. | 524/127 |
| 6,316,547 B1 | 11/2001 | Varlet | |
| 6,566,432 B2 | 5/2003 | Kawamura et al. | |
| 6,773,499 B2 | 8/2004 | Schoen et al. | |
| 6,812,274 B2 * | 11/2004 | Deckers et al. | 524/487 |
| 6,951,900 B2 * | 10/2005 | Blanchard et al. | 524/543 |
| 7,001,937 B2 | 2/2006 | Maki et al. | |
| 7,087,668 B2 * | 8/2006 | Hohner et al. | 524/487 |

FOREIGN PATENT DOCUMENTS

| | | |
|---|---|---|
| DE | 100 09 752 A1 * | 9/2001 |
| JP | 11-106573 | 9/1997 |
| WO | WO 00/37552 | 6/2000 |
| WO | WO 01/25331 A1 | 4/2001 |
| WO | WO 2006/119904 A1 | 11/2006 |

\* cited by examiner

*Primary Examiner*—Bernard Lipman
(74) *Attorney, Agent, or Firm*—McDonald Hopkins, LLC

(57) ABSTRACT

A masterbatch composition is provided that includes a colorant, a thermoplastic carrier, a metallocene polymer processing aid, and optionally an additive. Also provided is a method for making a masterbatch composition and a method for making a colorized polymer.

41 Claims, No Drawings

MASTERBATCH COMPOSITION

FIELD OF THE INVENTION

The present invention relates in general to masterbatch compositions having a colorant and optionally one or more additives, and a process for making the same.

BACKGROUND OF THE INVENTION

Colorants such as pigment preparations are often produced for masterbatches. A masterbatch is a granular, dust-free concentrate of a plastomeric or elastomeric polymer comprising a fraction of a colorant. Masterbatches are used to color plastics, being added to the plastic to be colored prior to or during processing. Masterbatches are used because they provide better colorant dispersion than neat colorant.

A variety of processes for producing masterbatches are known and the following processes are standard in the production of the masterbatches: a) the mixing of a suitable matrix (polymers) with the colorant; b) extrusion and kneading with subsequent grinding of the colorant concentrate; or c) extrusion and subsequent fine spraying, hot chopping, or strand pelletizing.

Known masterbatches generally include a colorant, a dispersant, a thermoplastic polymer, and optionally one or more additives. The thermoplastic polymer is commonly referred to as a "carrier." A typical commercial formulation of a masterbatch includes about 30% by weight of colorant, about 5% by weight of dispersant, about 10% by weight of additive, and about 55% by weight of a carrier.

Unfortunately, known masterbatches have a relatively low colorant concentration. Thus, it has been found that many known masterbatches have insufficient brilliance for high-quality applications. Larger proportions of colorant cannot be used in known masterbatches due to insufficient dispersion. Insufficient dispersion of the colorant particles can lead to a decrease in physical and mechanical properties of the end product, such as tensile strength, flexural modulus, elongation, and impact strength. Additional problems due to insufficient dispersion include thread breakage during spinning and clogging filters of melt spinning equipment. Accordingly, colorant concentrations have been limited in conventional masterbatches.

Another deficiency in known masterbatch compositions is the inability to include relatively significant amounts of additives such as ultraviolet light absorbers, light stabilizers, antioxidants, and blowing agents. Generally, additives are added only if desired and then in small amounts. Otherwise, it is believed that the processability of the masterbatch would be impaired.

Yet another deficiency in known masterbatch compositions is the inability to significantly improve the processability of the masterbatch itself and of the end product. For example, the melt extrusion of thermoplastics into shaped structures is generally accomplished by well-known procedures such as a reciprocating screw, injection molding, blow molding, compression molding, sheet extrusion, and fiber spinning.

Presently, there is no known system or method for providing a masterbatch composition that avoids the foregoing problems associated with conventional masterbatches. Accordingly, it is desirable to provide a masterbatch composition with improved processability that increases extrusion rates of the masterbatch composition as well as the end product without raising the melt temperature, while producing articles having smoother surfaces, and better physical and mechanical properties than with known masterbatches while reducing the amount of thermoplastic carrier.

It is also desirable to provide a masterbatch composition of colorants and optionally additives that produces better coloration of the end product while reducing the amount of thermoplastic carrier.

The present application, as described and claimed herein, addresses the deficiencies of prior art masterbatches.

SUMMARY OF THE INVENTION

In one aspect, the present invention is directed to a masterbatch that includes a colorant, a thermoplastic carrier, a metallocene polymer processing aid, and optionally an additive.

In another aspect, the present invention is directed to a process for making a masterbatch that includes mixing a colorant, a thermoplastic carrier, a metallocene polymer processing aid, and optionally an additive, and applying heat and shear to the mixture to form the masterbatch.

In a further aspect, the present invention is directed to a process for making a colorized polymer that includes introducing a highly-loaded masterbatch composition to a melt-processible polymer to form a melt processable polymer composition, wherein the masterbatch comprises a colorant, a thermoplastic carrier, a metallocene polymer processing aid, and optionally an additive, and extruding the polymer composition to form the colorized polymer.

DETAILED DESCRIPTION OF THE PREFERRED EMBODIMENTS

While the present invention is described with reference to embodiments described herein, it should be clear that the present invention is not limited to such embodiments. Therefore, the description of the embodiments herein is merely illustrative of the present invention and will not limit the scope of the invention as claimed.

A masterbatch composition having a colorant and optionally one or more additives is provided. This invention allows the use of standard plastic processing equipment to make relatively highly loaded color concentrates and additives. The masterbatch composition of the present invention exhibits excellent colorant dispersability, coloring properties, increased additive concentrations, as well as improved handleability, so that the colored end product has excellent physical and mechanical strength as well as excellent coloration. The present masterbatch composition includes a metallocene polymer processing aid that substantially eliminates many of the practical problems and limitations encountered in the current art. The metallocene polymer processing aid is compatible with various carrier resins, allows for decreasing the amount of conventional carrier resin, and also provides better mechanical and physical properties of the end products. The masterbatch composition allows for two to three times of increased concentration or loading of the colorants and additives. It also improves the colorant dispersion as well as the physical and mechanical properties of the end products. As the concentration of colorants and additives is increased, the amount of the masterbatch composition required to achieve the desired end product properties can be appreciably lower than conventional masterbatch compositions. The metallocene processing aid also improves the handleability of the masterbatch composition, as the masterbatch composition melts at lower temperatures that allow it to "wet out" or distribute more efficiently to provide better processability and increased throughput.

The masterbatch compositions provided generally include a colorant, a thermoplastic carrier, a metallocene polymer processing aid, and optionally additives such as antioxidants, ultraviolet light absorbers, and light stabilizers. The processing aid is a metallocene polymer which is a general term for a polymer in which metallocene is used as a catalyst for polymerization. The metallocene polymer processing aid is not a metallocene resin as is used in conventional masterbatches and has different structural and physical properties therefrom. This metallocene processing aid is a polymer having higher monodispersibility and a narrower molecular weight distribution (for instance, Mw/Mn<2 in the case of metallocene polyethylene) than a polymer in which a conventional Ziegler catalyst, Ziegler-Natta catalyst or the like is used. The metallocene polymer processing aid may have a range from amorphous to highly crystalline. It has been found that the metallocene polymer processing aid allows a large amount of colorant to be evenly dispersed in the presence of a high additive concentration, giving the end product excellent coloration as well as better physical and mechanical properties. Accordingly, the composition can provide molded or extruded articles having excellent mechanical strength.

Accordingly, the metallocene polymer is a preferred processing aid because it has a low drop point, low viscosity, low density, and good wetting capability. The drop point of polymer ranges preferably from 80° C. to 120° C. The viscosity of the polymer is preferably 60 to 6300 mPas. The density of the polymer is preferably 0.87 to 0.93 g/cm$^3$. The metallocene polymer may be present in the masterbatch composition up to about 20%, preferably from about 4% to about 12%. Suitable metallocene polymers include homopolymers of propylene or copolymers of propylene with one or more olefins or grafted with other polymers. Copolymers of propylene with ethylene are preferred. The ethylene content of the copolymers is from 0.1% to about 20%, preferably from about 2% to about 10%.

The metallocene polymer processing aid is highly compatible with various carrier resins. Illustrative examples of thermoplastic carriers are homopolymers or copolymers of high and low density polyethylene, high and low density polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, polyamides such as nylon-6 or nylon-6,6, polyvinyl chloride and copolymers of ethylene with 0.1-20 mol % of 1-butene, 1-pentene, 1-hexene, 4-methyl-1-pentene, 1-octene, 1-decene, 1-undecene, other impact modified alloys, or mixtures thereof. The polymer to be and the carrier polymer of the masterbatch can be, but do not have to be, the same.

Colorants added to the masterbatch may comprise pigments, single pigment dispersions, dyes, talc filled resins, nano composites, coated micas, powdered aluminum and other metals, optical brighteners, fluorescents, phosphorescents, or mixtures thereof. Pigments may be at least one or a combination of organic pigments and inorganic pigments, and there is no particular limitation. When organic pigments are used, the organic pigments may be present up to about 50% by weight of the masterbatch composition. In a preferred embodiment, the organic pigments are present in a range from about 10 to about 40% by weight of the masterbatch composition. If inorganic pigments are used, the inorganic pigments may be present up to about 75% by weight of the masterbatch composition. In a preferred embodiment, the inorganic pigments are present in a range from about 15% to about 75% by weight of the masterbatch composition. In another embodiment, both organic and inorganic pigments are used, and the organic pigments may be present up to about 20% and the inorganic pigments may be present up to about 60%. In one embodiment, the organic pigment is present from about 3% to about 20% and the inorganic pigment is present from about 10% to about 60%.

Illustrative examples of the organic pigments include azo and disazo pigments such as azo and disazo lake, Hansas, benzimidazolones, diarylides, pyrazolones, yellows and reds; polycyclic pigments such as phthalocyanines, quinacridones, perylenes, perinones, dioxazines, anthraquinones, isoindolins, thioindigo, diaryl or quinophthalone pigment, Aniline Black, or mixtures thereof. Illustrative examples of the inorganic pigments include inorganic pigments such as titanium oxide, titanium yellow, iron oxide, ultramarine blue, cobalt blue, chromic oxide green, Lead Yellow, cadmium yellow and cadmium red, carbon black pigments, and mixtures thereof. The organic and inorganic pigments can be used singly or in combination. These pigments may be in any form of a dry powder, single pigment dispersions made conventionally or according to this process, or mixtures thereof.

Optionally, the masterbatch composition may also comprise an additive. Illustrative examples are ultraviolet light absorbers, light stabilizers, antioxidants, flame-retardants, antibacterial agents, surface tension reducers, deodorizing agents, anti-static agents, anti-blocking agents, plasticizer agents, blowing agents, fillers, and other known additives, or mixtures thereof.

Ultraviolet light absorbers (UVA) shield the polymer from UV light by absorbing light energy and releasing the absorbed light energy harmlessly as heat energy. Hindered amine light stabilizers (HALS) scavenge radical intermediates formed in the photo-oxidation process. The higher the concentration of UVA and/or HALS, the greater the protection of the polymer (both the masterbatch carrier and the end product) from degradation and the color from fading. UVAs and HALS can be added up to about 45% by weight of the masterbatch. Preferred UVAs and HALS include those of the TINUVIN® grades from Ciba Specialty Chemicals, Inc. Illustrative examples of UVA's and HALS include salicylic acid derivatives such as phenyl salicylate, p-t-butyl salicylate, etc., benzophenone system such as 2,4-dihydroxy benzophenone, 2-hydroxy-4-methoxybenzophenone, etc., benzotriazole system such as 2-(2'-hydroxy-3',5'-di-t-butylphenyl)benzotriazole, 2-(2'-hydroxy-3'-t-butyl-5'-methylphenyl)-5-chlorobenzotriazole, etc., hindered amine system such as bis(2,2,6,6-tetramethyl-4-piperidyl) sebacate, dimethyl succinate-1-(2-hydroxyethyl)-4-hydroxy-2,2,6,6-tetramethyl piperidine condensation product, 2-hydroxybenzophenones, e.g. 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2'-hydroxyphenyl)benzotriazoles, e.g. 2-(2'-hydroxy-5'-methylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl)benzotriazole, and 2,2'-methylene bis(4-t-octyl-6-benzotriazolyl)phenol; benzoates, e.g. phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g. 2-ethyl-2'-ethoxyoxanilide and 2-ethoxy-4'-dodecyloxanilide; cyanoacrylates, e.g. ethyl-α-cyano-β,β- diphenylacrylate and methyl-2-cyano-3-methyl-3-(p-methoxyphenyl)acrylate, and any other known UVA, or mixtures thereof.

Additional illustrative examples of HALS include 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidylsebacate, bis(1,2,2,6,6-pentamethyl-4-piperidyl)sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(1,2,2,6,6-pentamethyl-4-piperidyl)-di(tridecyl)-1,2,3,4-butane tetracarboxylate, bis(1,2,2,6,6-pentamethyl-4-piperidyl)-2-butyl-2-(3',5'-di-t-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino) hexane/dibromoethane polycondensate, 1,6-bis(2,2,6,6-tetramethyl-4-piperidylamino)hexane/2,4-dichloro-6-t-octyl amino-s-triazine polycondensate, 1,6-bis(2,2,6,6-tetramethyl-4-piperidylamino) hexane/2,4-dichloro-6-morphol ino-s-triazine polycondensate, and the like, or mixtures thereof.

Antioxidants, including processing stabilizers, can be added to the masterbatch composition up to about 15% by weight of the masterbatch. Peroxide polymer degradation generally occurs during processing (due to heat or shear), or at the time of light exposure. Peroxide radicals may be formed during this period, which in turn may lead to the formation of hyperoxides. Antioxidants are incorporated into polymers to stabilize peroxide radicals to prevent degradation. Optimal polymer stability is achieved when the initial molecular weight and/or the initial color of the polymer is maintained. Therefore, the present masterbatch composition provides a higher degree of protection by achieving higher additive concentrations without sacrificing colorant concentration. In one embodiment, both UVAs (and/or HALS) and an antioxidant may be added up to about 60% by weight of the masterbatch. It is preferred in such embodiments that the UVAs (and/or HALS) are added up to about 45% by weight of the masterbatch, and the antioxidant is added up to about 15% by weight of the masterbatch. Sterically hindered phenols or HALS are preferred antioxidants, particularly sterically hindered phenols of the Irganox® grades from Ciba Specialty Chemicals, Inc. Other illustrative examples of antioxidants include a phenol system such as 2,6-di-t-butyl-p-Cresol, pentaerythritol-tetrakis-(3,5-di-t-butyl-4-hydroxyphenyl) propionate methyl phenol, octadecyl-3-(3,5-di-t-butyl-4-hydroxyphenyl) propionate, etc., phosphorus system such as tris(2,4-di-t-butylphenyl)phosphate, distearylpnetaerythritol diphophate, tetrakis(2,4-di-t-butylphenyl)-4,4'-biphenylene phosphonate, etc., sulfur system such as distearyl-3,3'-thiodipropionate, pentaerythritol-tetrakis-(3-laurylthiopropionate), hindered phenol type antioxidants and peroxide decomposers, HALS (as set described above), or mixtures thereof.

Illustrative examples of hindered phenol type antioxidants are 2,6-di-t-butyl-4-methylphenol, styrenated phenol, n-octadecyl-3-(3,5-di-t-butyl-4-hydroxylphenyl) propionate, 2,2'-methylene bis(4-methyl-6-t-butylphenol), 2-t-butyl-6-(3-t-butyl-2-hydroxy-5-methylbenzyl)-4-methylphenylacrylate, 2-[1-(2-hydroxy-3,5-di-t-pentylphenyl)ethyl]-4,6-di-t-pentylphenyl acrylate, 4,4'-butylidene bis(3-methyl-6-t-butylphenol), 4,4'-thio-bis(3-methyl-6-t-butylphenol), alkylated bisphenol, tetrakis[methylene-3-(3,5-di-t-butyl-4-hydroxyphenyl)-proprionate] methane, 3,9-bis[2-{3-(3-t-butyl-4-hydroxy-5-methylphenyl)-propionyloxy}-1,1-dimethylethyl]-2,4,8,10-tetraoxyspiro [5.5]undecane, or mixtures thereof.

Illustrative examples of peroxide decomposers are organic phosphorus type peroxide decomposers, such as tris-nonylphenylphosphite, triphenylphosphite and tris(2,4-di-t-butylphenyl)phosphite; and organic thio type peroxide decomposers, such as dilauryl-3,3'-thiodipropionate, dimyristyl-3,3'-thiodipropionate, distearyl-3,3'-thiodipropionate, pentaerythrityltetrakis(3-laurylthiopropionate), ditridecyl-3,3'-thiodipropionate and 2-mercaptobenzimidazole, or mixtures thereof.

Illustrative examples of flame-retardants are phosphoric acid systems such as allyl diallyl phosphate, cresyl diphenyl phosphate, octyl diphenyl phosphate, triallyl phosphate, tributyl phosphate, triphenyl phosphate, tris(β-chloroethyl)phosphate, tris(dichloropropyl)phosphate, tris(2,3-dibrompropyl)phosphate, tris(bromo-chloropropyl)phosphate, etc., chlorine system such as chlorinated paraffin, chlorinated polyphenyl, perchloropentacyclodecane, etc., bromine system such as tetrabromoethane, tetrabromobutane, hexaborombenzene, decabromodiphenyloxide, polydibromophenyloxide, bis(tribromophenoxy)ethane, ethylene bis-bromonorbornane dicarboxylmide, ethylene bistetrabromophthalimide, etc. reaction type such as chlorendic acid anhydride, tetrabromo phthalic anhydride, tetrabromo bisphenol A, dietoxy-bis-(2-hydroxyethyl)-aminomethyl phosphate, dibormcresyl alycidyl ether, etc, or mixtures thereof.

Illustrative examples of antibacterial agents include, phenol ether based antibacterial agents, such as those having the phenol group in the intramolecular skeleton, for example, 10,10'-oxybisphenoxa arsine, etc.; natural antibacterial agents, such as those having tropolone as a central skeleton, for example, hinokitiol, β-dolabulin, etc., as glycerol ester of fatty acid, lower fatty acid monoglycerol ester, sucrose fatty acid ester, polyglycerol fatty acid ester, for example, monoglyceride caprylate, monoglyceride caprate, lauric acid monoglyceride, Sugar-ester palpitate, decaglycerol monocaprate, hexaglycerol caprylate, etc., zeolite-based compounds, part or whole of ion-exchangeable ion in zeolite-based compounds, for example, part or whole of sodium ion, calcium ion, potassium ion, magnesium ion, iron ion, etc. is substituted with ions with antibacterial property, such as silver ion, copper ion, zinc ion, ammonium ion, etc. can be exemplified. These compounds can be used singly or two or more kinds of them can be used in combination.

Fillers are typically inexpensive particulate materials that do not contribute to the color. Illustrative examples of fillers include, among others, talcs, micas, clays, nano-clays, silicas, or mixtures thereof.

The masterbatch composition described herein may contain other additives or ingredients and should not be limited to the stated formulations. In one embodiment, a dispersion package can be added to the masterbatch composition in an amount up to about 25% by weight of the masterbatch. In another embodiment, the dispersion package is added in an amount from about 2% to about 8% based on the weight of the masterbatch. The dispersion package can be waxes, metal salts, surfactants, coupling agents, organometallic compounds, and mixtures thereof. Illustrative examples include conventional polyethylene and polypropylene waxes and derivatives thereof such as acid-modified products and metal salts of acid-modified products, as well as zinc stearate, magnesium stearate, aluminium stearate, calcium stearate and ethylene bisteramide, and mixtures thereof.

Before actual mixing of the masterbatch, the components can be premixed if desired, for which drum or tumbler mixers may be used. In the actual mixing process, the mixing is generally performed in a high intensity mixer. In one embodiment, the masterbatch is prepared by mixing the components in a Henschel-type mixer for up to 30 minutes, preferably for 4 to 10 minutes. It is understood that the masterbatch components may be added together and mixed, or added individually at any point during the mixing process. Actual dispersion generally takes place in a single-screw or twin-screw extruder; however, any equipment known in the art may be used. Illustrative examples include Buss kneaders, planetary roll extruders, open double-trough kneaders, rapid stirrers, internal fluxing mixers such as Banbury mixers and Farrel continuous mixers, or the like.

The masterbatch may be introduced to any compatible polymer and processed. It is understood that the masterbatch composition of the present invention can be used for coloring polymers formed into various shapes, such as sheet, film, tube, bottles, containers, molded products and other molded articles. The term processing is used herein to describe the conversion of polymers into articles of a desired shape. Illustrative examples of processing are extrusion molding, injection molding, blow molding, compression molding and calendering. The term processable is used herein to mean capable of processing. The addition of the masterbatch to the melt-processible polymer can be accomplished by any means known in the art. It is possible to use the same methods as for preparing the masterbatch itself. It is understood that the masterbatch carrier polymer can be the same or different than the melt-processible polymer. The masterbatch composition may be introduced and processed via a batch or continuous process. In one illustrative embodiment, the masterbatch may be introduced to the melt-processible polymer and processed on a rubber compounding mill, simple kneader, or in a Banbury or other internal mixer or in a mixing extruder. Alternatively, the masterbatch can be metered to the feed section of an extruder by appropriate devices. Continuous processes can be carried out, for example, in rapid mixers, single-screw extruders, twin-screw extruders, Buss kneaders, planetary roll extruders, open double-trough kneaders or rapid stirrers. Continuous processes are preferred.

EXAMPLES

The following masterbatch examples set forth in Table 1 below were prepared in accordance with the invention and are intended to illustrate the invention without, however, limiting it. The percentages shown in Table 1 below are percent by weight of the total masterbatch composition.

TABLE 1

|  | Example 1 | Example 2 | Example 3 |
| --- | --- | --- | --- |
| Resin | 14.9% (Polyethylene) | 10.7% (High Density Polyethylene) | 17.0% (Polyethylene) |
| Processing Aid | 7.0% | 7.0% | 6.97% |
| Colorant | 15.2% | 56.2% | 38.7% |
| UVA/HAL | 44.6% (Tinuvin) | 21.5% (Tinuvin) | 25.0% (Tinuvin) |
| AO | 15.3% (Irganox) | 3.6% (Irganox) | 8.3% (Irganox) |
| Dispersion Package | 2.0% (Zn Stearate) 1.0% Mineral Oil | 1.0% (Zn Stearate) | 3.0% (Zn Stearate) 1.0% Mineral Oil |

Table 1 above demonstrates that addition of the metallocene processing aid to the masterbatches allows for a higher colorant and additive concentration, with less carrier than conventional masterbatches. The metallocene processing aid used in Examples 1-3 has a viscosity of 1800 mPas, a drop point of 86° C., and a density of 0.87 g/cm$^3$. As the masterbatch contains less carrier, it requires a lower melt temperature and shorter run time. Therefore, it significantly reduces cycle times, resulting in higher throughputs. An increase in the extrusion throughput of the end product colored by the masterbatch also has been observed. In some cases, a 12-15% increase has been observed. The masterbatches in Examples 1-3 also provide better processing characteristics, such as higher average extruder amps versus conventional masterbatches. It is known that higher average extruder amps indicate consistently better feeding (i.e., no loss of feed) during extrusion. In some cases, use of the masterbatches resulted in higher gloss, improved texture, and improved physical and mechanical properties of the final product when compared to conventional masterbatches. In some cases, a 12-18% increase in toughness has been observed in IZOD impact strength testing (ASTM D256).

The invention has been described above and, obviously, modifications and alternations will occur to others upon a reading and understanding of this specification. The claims as follows are intended to include all modifications and alterations insofar as they come within the scope of the claims or the equivalent thereof.

What is claimed is:

1. A masterbatch composition comprising a colorant, a thermoplastic carrier, and a metallocene polymer processing aid, wherein said metallocene polymer processing aid is a substantially amorphous metallocene polypropylene polymer or copolymer.

2. The masterbatch composition of claim 1, wherein said metallocene polymer processing aid is an amorphous metallocene polypropylene copolymer obtained by polymerizing a propylene monomer with about 2-10% ethylene comonomer in the presence of a metallocene catalyst.

3. The masterbatch composition of claim 1, wherein said metallocene polymer processing aid exhibits a density of about 0.87-0.93 g/cm$^3$, a drop point of about 80-145° C., and a viscosity of about 60-6300 mPas.

4. The masterbatch composition of claim 1, wherein said colorant is about 15-75% by weight.

5. The masterbatch composition of claim 1, wherein said colorant is about 15-75% by weight, said thermoplastic carrier is about 9-60% by weight, and said metallocene polymer is about 2-20% by weight.

6. The masterbatch composition of claim 1, wherein said colorant is selected from the group consisting of organic pigment, inorganic pigment, single pigment dispersion, dye, coated mica, powdered aluminum, optical brightener, fluorescent, and phosphorescent.

7. The masterbatch composition of claim 1, wherein said colorant comprises an organic pigment about 5-50% by weight.

8. The masterbatch composition of claim 1, wherein said colorant comprises an organic pigment about 10-40% by weight.

9. The masterbatch composition of claim 1, wherein said colorant comprises an inorganic pigment about 0-71% by weight.

10. The masterbatch composition of claim 1, wherein said colorant comprises an organic pigment about 3-40% by weight and an inorganic pigment about 10-60% by weight.

11. The masterbatch composition of claim 1, wherein said thermoplastic carrier is selected from the group consisting of homopolymers and copolymers of high and low density polyethylene, high and low density polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, and polyamides.

12. The masterbatch composition of claim 1 further comprising an additive.

13. The masterbatch composition of claim 12, wherein said additive is selected from the group consisting of antioxidants, ultraviolet light absorbers, light stabilizers, flame-retardants, antibacterial agents, surface tension reducers, deodorizing agents, anti-static agents, anti-blocking agents, plasticizer agents, fillers, and blowing agents.

14. The masterbatch composition of claim 12 wherein said additive is about 5-60% by weight.

15. The masterbatch composition of claim 12, wherein said additive comprises an antioxidant about 0-15% by weight, a light stabilizer about 0-45% by weight, and an ultraviolet light absorber about 0-45% by weight.

16. The masterbatch composition of claim 1 further comprising a dispersion package.

17. The masterbatch composition of claim 16, wherein said dispersion package is selected from the group consisting of waxes, metal salts, coupling agents, and surfactants.

18. The masterbatch composition of claim 16, wherein said dispersion package is up to about 25% by weight.

19. The masterbatch composition of claim 16, wherein said dispersion package is about 2-8% by weight.

20. A masterbatch composition comprising a colorant, a thermoplastic carrier, a metallocene polymer processing aid and greater than 5% to about 60% by weight of an additive, wherein said additive is selected from the group consisting of antioxidants, ultraviolet light absorbers, and light stabilizers.

21. The masterbatch composition of claim 20, wherein said metallocene polymer processing aid is a metallocene polypropylene.

22. The masterbatch composition of claim 20, wherein said metallocene polymer processing aid is obtained by polymerizing a propylene monomer with about 2-10% ethylene comonomer in the presence of a inetallocene catalyst.

23. The masterbatch composition of claim 20, wherein said metallocene polymer processing aid exhibits a density of about 0.87-0.93 g/cm$^3$, a drop point of about 80-145° C., and a viscosity of about 60-6300 mPas.

24. The masterbatch composition of claim 20, wherein said colorant is about 15-75% by weight.

25. The masterbatch composition of claim 20, wherein said colorant is about 15-75% by weight, said thermoplastic carrier is about 9-60% by weight, and said metallocene polymer is about 2-20% by weight.

26. The masterbatch composition of claim 20, wherein said colorant is selected from the group consisting of organic pigment, inorganic pigment, single pigment dispersion, dye, coated mica, powdered aluminum, optical brightener, fluorescent, and phosphorescent.

27. The masterbatch composition of claim 20, wherein said colorant comprises an organic pigment about 5-50% by weight.

28. The masterbatch composition of claim 20, wherein said colorant comprises an organic pigment about 10-40% by weight.

29. The masterbatch composition of claim 20, wherein said colorant comprises an inorganic pigment about 0-71% by weight.

30. The masterbatch composition of claim 20, wherein said colorant comprises an organic pigment about 3-40% by weight and an inorganic pigment about 10-60% by weight.

31. The masterbatch composition of claim 20, wherein said thermoplastic carrier is selected from the group consisting of homopolymers and copolymers of high and low density polyethylene, high and low density polypropylene, polystyrene, polyoxymethylene, polyethylene terephthalate, polybutylene terephthalate, polymethyl methacrylate, polyether sulfones, polysulfones, polyether ketones, polystyrene copolymers, acrylonitrile-butadiene-styrene terpolymers, and polyamides.

32. The masterbatch composition of claim 20, further comprising at least one of flame-retardants, antibacterial agents, surface tension reducers, deodorizing agents, anti-static agents, anti-blocking agents, plasticizer agents, fillers, and blowing agents.

33. The masterbatch composition of claim 20, wherein said additive comprises an antioxidant about 0-15% by weight, a light stabilizer about 0-45% by weight, and an ultraviolet light absorber about 0-45% by weight.

34. The masterbatch composition of claim 20 further comprising a dispersion package.

35. The masterbatch composition of claim 34, wherein said dispersion package is selected from the group consisting of waxes, metal salts, coupling agents, and surfactants.

36. The masterbatch composition of claim 34, wherein said dispersion package is up to about 25% by weight.

37. The masterbatch composition of claim 34, wherein said dispersion package is about 2-8% by weight.

38. A process for making a masterbatch composition comprising the steps of:
   a) mixing a colorant, a thermoplastic carrier, and a metallocene polymer processing aid, wherein said metallocene polymer processing aid is a substantially amorphous metallocene polypropylene polymer or copolymer; and
   b) applying heat and shear to said mixture whereby said pigment disperses in said mixture to form said masterbatch composition.

39. The process of claim 38 wherein an additive is further included in said mixing step.

40. A process for making a colorized polymer comprising the steps of:
   a) introducing a masterbatch composition to a melt-processible polymer to form a processable polymer composition, wherein said masterbatch composition comprises a pigment, a thermoplastic carrier, a metallocene polymer processing aid and, greater than 5% to about 60% by weight of an additive, wherein said additive is selected from the group consisting of antioxidants, ultraviolet light absorbers, and light stabilizers; and b) processing said polymer composition to form said colorized polymer.

41. The process of claim 40 wherein said masterbatch composition further comprises an additive in said introducing step.

* * * * *